US007792187B2

(12) United States Patent
Bulzacchelli

(10) Patent No.: US 7,792,187 B2
(45) Date of Patent: Sep. 7, 2010

(54) MULTI-TAP DECISION FEEDBACK EQUALIZER (DFE) ARCHITECTURE ELIMINATING CRITICAL TIMING PATH FOR HIGHER-SPEED OPERATION

(75) Inventor: John F. Bulzacchelli, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 11/848,477

(22) Filed: Aug. 31, 2007

(65) Prior Publication Data

US 2009/0060021 A1   Mar. 5, 2009

(51) Int. Cl.
*H03K 5/159* (2006.01)
(52) U.S. Cl. .................. 375/233; 375/231; 375/232
(58) Field of Classification Search ............. 375/231, 375/232, 233
See application file for complete search history.

(56) References Cited

U.S. PATENT DOCUMENTS

| 5,642,382 | A  | * | 6/1997 | Juan ........................... | 375/232 |
| 2008/0187036 | A1 | * | 8/2008 | Park et al. .................... | 375/233 |
| 2009/0060021 | A1 | * | 3/2009 | Bulzacchelli ............... | 375/233 |
| 2010/0020861 | A1 | * | 1/2010 | Leibowitz et al. ........... | 375/231 |
| 2010/0054324 | A1 | * | 3/2010 | Bulzacchelli et al. ....... | 375/233 |

OTHER PUBLICATIONS

V. Balan et al., A 4.8-6.4-Gb/s Serial Link for Backplane Applications Using Decision Feedback Equalization, IEEE J. Solid-State Circuits, vol. 40, pp. 1957-1967, Sep. 2005.
T. Beukema et al., A 6.4-Gb/s CMOS SerDes Core with Feed-Forward and Decision-Feedback Equalization, IEEE J. Solid-State Circuits, vol. 40, pp. 2633-2645, Dec. 2005.
S. Kasturia and J. H. Winters, Techniques for High-Speed Implementation of Nonlinear Cancellation, IEEE J. Sel. Areas Commun., vol. 9, pp. 711-717, Jun. 1991.
R. Payne et al, A 6.25-Gb/s Binary Transceiver in 0.13 m CMOS for Serial Data Transmission Across High Loss Legacy Backplane Channels, IEEE J. Solid-State Circuits, vol. 40, pp. 2646-2657, Dec. 2005.
N. H. E. Weste and K. Eshraghian; Principles of CMOS VLSI Design: A Systems Perspective, Chapter 5, Addison-Wesley, Reading, MA, second edition, 6 pages, 1993.

* cited by examiner

*Primary Examiner*—Sudhanshu C Pathak
(74) *Attorney, Agent, or Firm*—Tutunjian & Bitetto, P.C.; Anne V. Dougherty, Esq.

(57) ABSTRACT

A decision feedback equalizer (DFE) and method include summer circuits to add a dynamic feedback signal representing a dynamic feedback tap to a received input and to speculate on a speculative tap. Data slicers are configured to receive outputs of the summer circuits and sample the outputs of the summer circuits. First multiplexers are included, each of which is configured to receive a first input from a corresponding data slicer. Second multiplexers are included, each of which is configured to receive an output of a plurality of the first multiplexers. The second multiplexers have an output fed back to a second input of the first multiplexers, and the second multiplexer output is employed to provide a select signal for a second multiplexer on a different section of the DFE and to drive the dynamic feedback signal to a summer circuit on a same section of the DFE.

20 Claims, 8 Drawing Sheets

MULTI-TAP DECISION FEEDBACK EQUALIZER (DFE) ARCHITECTURE ELIMINATING CRITICAL TIMING PATH FOR HIGHER-SPEED OPERATION

GOVERNMENT RIGHTS

This invention was made with Government support under Contract No.: H98230-04-C-0920 awarded by the National Security Agency. The Government has certain rights in this invention.

BACKGROUND

1. Technical Field

The present invention relates to equalization techniques for high-speed data communications and more particularly to implementations of decision feedback equalizer circuits.

2. Description of the Related Art

As the processing power of digital computing engines grows with improvements in technology, and increasingly interconnected networks are developed to harness this power, higher bandwidth data transmission is needed in systems such as servers and data communication routers. Increasing data line rates above a few gigabits per second becomes challenging, however, due to limited channel bandwidth. The bandwidth of an electrical channel (e.g., transmission line) may be reduced by several physical effects, including skin effect, dielectric loss, and reflections due to impedance discontinuities.

In the time domain, limited channel bandwidth leads to broadening of the transmitted pulses over more than one unit interval (UI), and the received signal suffers from intersymbol interference (ISI). At the data rates being demanded, signal integrity may be significantly degraded even over short distances of interconnect (such as several inches of trace on a circuit board). An effective method of compensating for the signal distortions due to limited channel bandwidth is to add equalization functions to the input/output (I/O) circuitry.

The use of a nonlinear equalizer known as a decision-feedback equalizer (DFE) in the receiver is particularly well-suited to equalizing a high-loss channel. Unlike linear equalizers, the DFE is able to flatten the channel response (and reduce signal distortion) without amplifying noise or crosstalk, which is a critical advantage when channel losses exceed 20-30 dB.

In a DFE, the previously decided bits are fed back with weighted tap coefficients and added to the received input signal. If the magnitudes and polarities of the tap weights are properly adjusted to match the channel characteristics, the ISI from the previous hits in the data stream will be cancelled, and the bits can be detected by a data slicer with a low bit error rate (BER). The adjustment of the tap weights can be performed either manually or automatically by an appropriate adaptive algorithm. A major challenge in the design of a DFE operating at multi-gigabits per second is ensuring that the feedback signals have settled accurately at the slicer input before the next data decision is made.

If a full-rate DFE architecture is used, the feedback loop delay (including the decision-making time of the slicer and analog settling time of the DFE summing amplifiers) needs to be less than one UI. Simply switching to a half-rate architecture does not ease this requirement, as there is still only one UI available to establish the feedback from the previously detected bit, weighted by the first tap coefficient (denoted as h1).

The timing requirements on the first DFE feedback tap can be eased by adopting a technique known as speculation or loop unrolling (See e.g., S. Kasturia and J. H. Winters in "Techniques for High-Speed Implementation of Nonlinear Cancellation", IEEE J. Sel. Areas Commun., Vol. 9, pp. 711-717, June 1991). In this approach, both +h1 and −h1 are added to the input signal with two parallel summing amplifiers. Since (for binary data transmission) the previous bit can only have two different values, one of these dc offsets added to the input signal represents the correct compensation of the ISI due to the previous bit. The outputs of the two summing amplifiers are then converted by two parallel slicers into two data decisions. Once the previous bit is known, the data decision corresponding to correct polarity of h1 compensation is selected with a 2:1 multiplexer (MUX). Since the h1 compensation is implemented as multiple dc offsets instead of a dynamically changing feedback signal, analog settling time requirements for the first DFE feedback tap are eliminated.

In principle, additional DFE feedback taps (such as the second one, denoted h2, the third one, denoted h3, etc.) may also be implemented by speculation, but the number of parallel data decisions that need to be made grows exponentially with the number of taps. In practice, a more hardware-efficient design of a high-speed DFE can be obtained by adopting a hybrid speculative/dynamic feedback architecture, in which the first tap is implemented by speculation, and the rest of the taps are implemented as dynamically changing feedback signals. With half-rate clocking (or lower rate clocking such as quarter-rate), the critical timing requirement in this hybrid architecture is the loop delay for the h2 feedback tap (including time for analog settling). Since the h2 feedback tap compensates for ISI due to the bit which arrived two UI earlier, ideally there should be 2 UI of time available for accurately establishing the h2 feedback signal at the slicer inputs. This 2 UI loop delay will be referred to here as the "fundamental timing limit" of the hybrid speculative/dynamic feedback DFE.

Unfortunately, this fundamental timing limit cannot be fully achieved in prior art implementations of the hybrid speculative/dynamic feedback DFE. In order not to disturb the h2 dynamic feedback signal prematurely, these implementations deliberately delay the selection between the speculative data decisions until some time after the slicers have sampled the equalized data signals. This delay of the select signal (usually accomplished with a clocked latch) creates a second critical timing path for the DFE. With typical propagation delays, this second critical timing path prevents the DFE from achieving its fundamental timing limit. To allow a DFE to operate at higher frequency and achieve its fundamental timing limit, it is desirable to have an architecture which eliminates this second critical timing path while still preventing disturbance of the h2 feedback signal at the time of data decision by the slicers.

SUMMARY

A decision feedback equalizer (DFE) includes summer circuits to add a dynamic feedback signal representing a dynamic feedback tap to a received input and to speculate on a speculative tap. Data slicers are configured to receive outputs of the summer circuits and sample the outputs of the summer circuits. First multiplexers are included, each of which is configured to receive a first input from a corresponding data slicer. Second multiplexers are included, each of which is configured to receive an output of a plurality of the first multiplexers. The second multiplexers have an output fed back to a second input of the first multiplexers, and the second multiplexer output is employed to provide a select signal for a second multiplexer on a different section of the DFE and to drive the dynamic feedback signal to a summer circuit on a same section of the DFE.

In other embodiments, the dynamic tap may include a signal transition which occurs after a transition in the clock signal such that the dynamic tap is not disturbed before a data decision time of the data slicers. An update of the output of the second multiplexer is preferably not delayed by waiting for the select signal. Inputs to the second multiplexers are preferably always logically identical during a change in the select signal. Positive feedback of a slave feedback loop preferably latches all inputs of the second multiplexer to logically identical values.

A method for decision feedback equalization includes speculating on an h1 tap using summer circuits configured to add a dynamic feedback signal representing an h2 tap to a received input, sampling outputs of the summer circuits in accordance with a clock signal such that data slicers output data bits, receiving a first input from a corresponding data slicer by first multiplexers, receiving an output of the first multiplexers by second multiplexers, and feeding back an output of the second multiplexers to a second input of the first multiplexers wherein the second multiplexer output is employed to provide a select signal for a second multiplexer on a different section of a decision feedback equalizer (DFE) and to drive the dynamic feedback signal to a summer circuit on a same section of the DFE.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
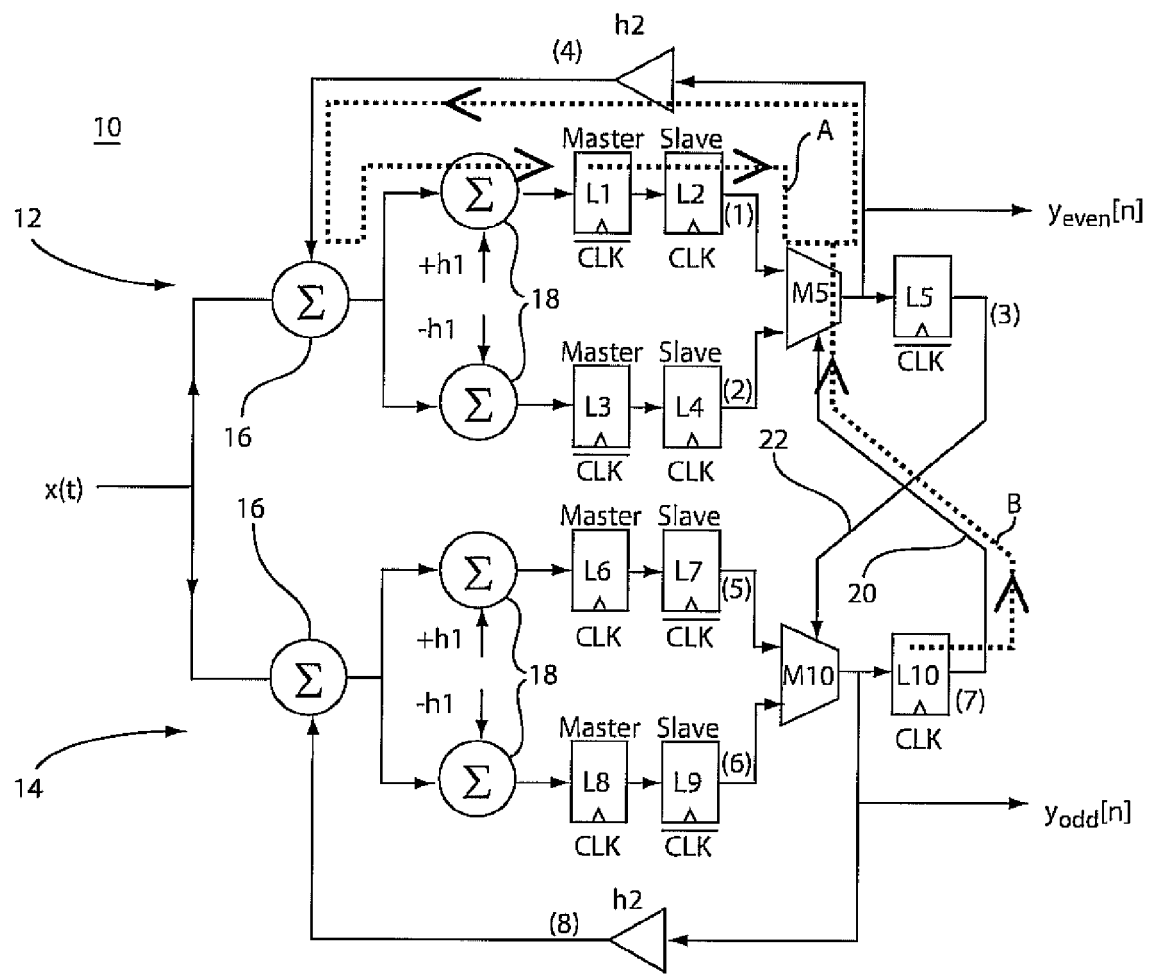
FIG. 1 is a schematic diagram showing a prior art half-rate decision feedback equalizer (DFE) architecture.

Present embodiments include decision feedback equalizer circuits (DFE) for equalizing high-speed serial links where a maximum operating frequency is set only by a fundamental timing limit. In one embodiment, a hybrid speculative/dynamic feedback half-rate DFE is provided for equalizing high-speed serial links where the maximum operating frequency is set only by the fundamental timing limit: that is, for a DFE with a speculative first tap, the h2 feedback loop delay is less than 2 UIs (unit intervals).

In this new DFE architecture, a slave latch of a conventional master-slave flip-flop is replaced by a multiplexer (MUX) driven by a half-rate clock. During one phase of the clock, the MUX (denoted as, e.g., "slave MUX") reads the output of its corresponding master latch (slicer) so that its bit decision is passed to a 2:1 MUX used for speculation. During the other phase of the clock, this slave MUX reads its other input, which is connected to the output of the 2:1 MUX used for speculation. Since the output of the 2:1 MUX used for speculation is passed back (through two slave MUXes) to both of its own inputs, a positive feedback loop (denoted "slave loop") is formed which latches the correct data bit (e.g., the data decision corresponding to correct polarity of h1 compensation). Since both of the inputs of the 2:1 MUX used for speculation are now logically identical, changing the select signal of this 2:1 MUX has no effect on its output.

Consequently, it is not necessary to delay the select signal of this 2:1 MUX (to prevent premature disturbance of the h2 dynamic feedback signal) in the new DFE architecture. Without such delay, the timing of the select signal path is not critical to the maximum operating frequency. Elimination of this critical timing path permits the DFE to achieve its fundamental timing limit.

Embodiments of the present invention can take the form of an entirely hardware embodiment, an entirely software embodiment or an embodiment including both hardware and software elements. In a preferred embodiment, the present invention is implemented in hardware; however, elements may be implemented in software, which may include but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuits as described herein may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GD-SII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now to the drawings in which like numerals represent the same or similar elements and initially to FIG. 1, a prior art architecture 10 of a half-rate DFE is shown. A first stage of analog summers 16 is used to add a dynamic feedback signal representing an h2 DFE tap to a received input x(t). An h1 DFE tap is implemented by speculation, so both +h1 and −h1 are added to the input in a second stage of analog summers 18. A full design may also include additional dynamic taps, but those taps are not shown for simplicity and because they are not relevant to the critical timing paths being addressed here. Data slicers are realized as master-slave flip-flops (L1, L2; L3, L4; L6, L7; and L8, L9).

CLK is a half-rate clock signal, so the upper two master-slave flip-flops (L1-L2 and L3-L4) sample the equalized data on the rising edge of CLK (producing even data bits in DFE half or section 12), and the lower two master-slave flip-flops (L6-L7 and L8-L9) sample the equalized data on the falling edge of CLK (producing the odd data bits in DFE half or section 14). 2:1 MUXes M5 and M10 at the master-slave flip-flop outputs select the data decisions which correspond to correct polarity of h1 compensation. Since the previous bit is decided by the opposite DFE half, a select signal 20 for the 2:1 MUX in the even DFE half 12 comes from the odd DFE half 14, and a select signal 22 for the 2:1 MUX in the odd DFE half 14 comes from the even DFE half 12.

As described above, a critical timing requirement in this hybrid speculative/dynamic feedback DFE architecture 10 is a loop delay for the h2 feedback tap, whose path is indicated in FIG. 1 by a dashed line labeled "A". To satisfy the fundamental timing limit defined earlier, the round-trip loop delay must be less than 2 UI, so one can write: $T_{clk2q}+T_{pd}+T_{sum}+T_{setup}<2$ UI, where $T_{clk2q}$ is the clock-to-Q delay of the master-slave flip-flops (L1-L4, and L6-L9), $T_{pd}$ is the total propagation delay through the 2:1 MUX (M5 or M10) and the h2 feedback circuitry, $T_{sum}$ is the settling time of the analog summing stages (16 and 18), and $T_{setup}$ is the setup time of the master-slave flip-flops (L1-L4, and L6-L9). Unfortunately, the fundamental timing limit set by this equation often cannot be fully achieved in this architecture due to a second critical timing path, indicated in FIG. 1 by a dashed line labeled "B".

To not disturb the h2 dynamic feedback signal prematurely, the previous bit is delayed in latch L10 before it selects the 2:1 MUX M5 of the even DFE half 12. (An example given below will illustrate the problem that occurs when this delay is eliminated.) Because latch L10 is clocked with the same phase of CLK as the slaves L2 and L4, the select signal of the 2:1 MUX M5 may lag its data inputs if the clock-to-Q delay of L10 exceeds the clock-to-Q delays of the master-slave flip-flops (L1-L2 and L3-L4), in which case the output of the 2:1 MUX M5 will suffer extra delay.

Figure 2:
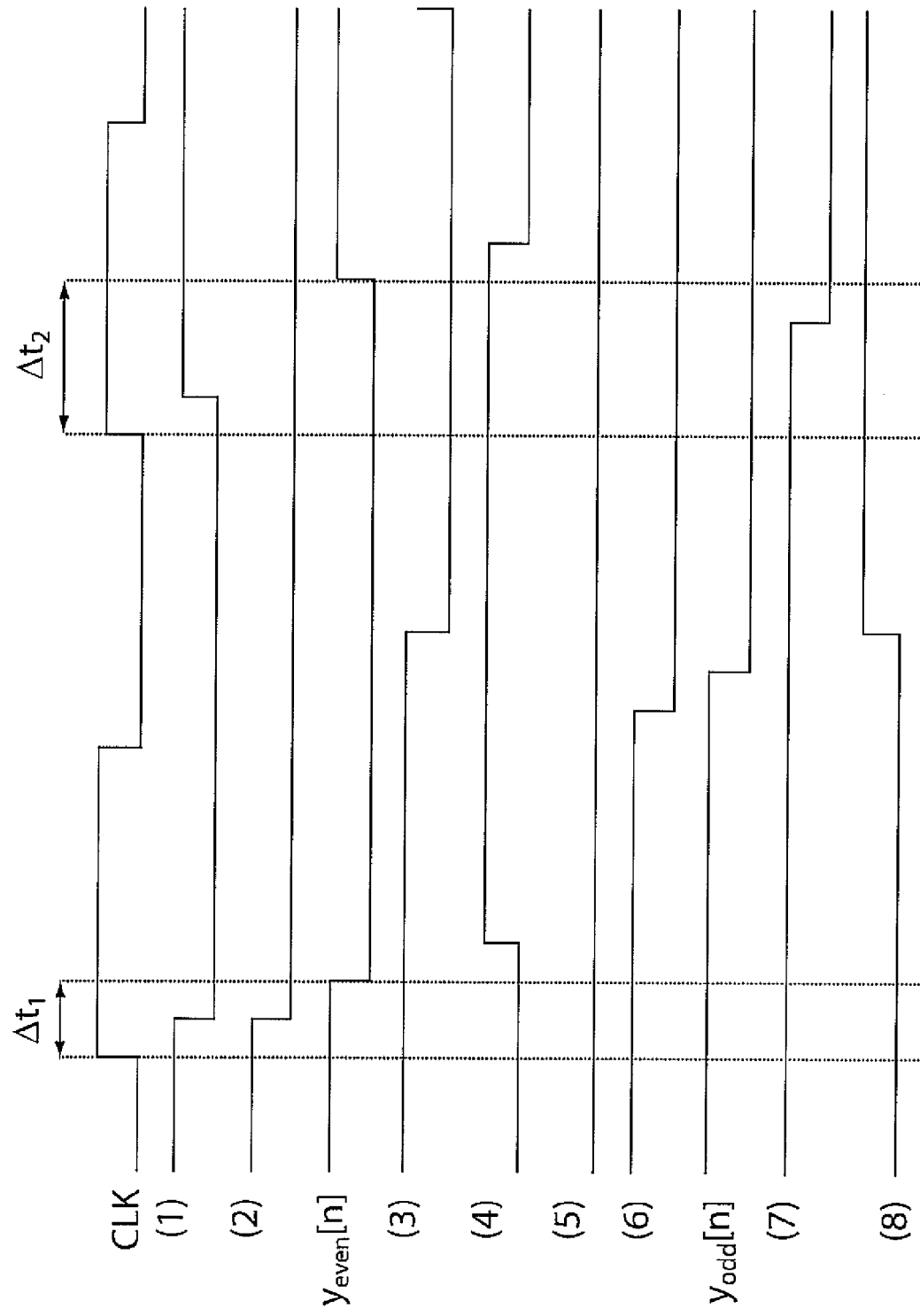
FIG. 2 is a timing diagram for the DFE architecture shown in FIG. 1.

Referring to FIG. 2 with continued reference to FIG. 1, a timing diagram for the DFE architecture shown in FIG. 1 illustrates this point further. A coefficient of the h2 feedback tap is assumed to be negative, so signals (4) and (8) have polarities opposite to $y_{even}[n]$ and $y_{odd}[n]$, respectively. The clock-to-Q delays of L10 (signal (7)) and L5 (signal (3)) are exaggerated in FIG. 2 to highlight the impact of the second critical timing path. At the time of the first rising edge of CLK, the output of latch L10 (labeled (7)) does not switch but maintains its high value. Therefore, only the clock-to-Q delay of master-slave flip-flop L3-L4 and the propagation delay of the 2:1 MUX M5 contribute to the delay ($\Delta t_1$) between the rising edge of CLK and the update in the value of $y_{even}[n]$.

At the time of the second rising edge of CLK, the output (7) of latch L10 switches from high to low. Since at this time master-slave flip-flops L1-L2 and L3-L4 make different decisions (signals (1) and (2)), the 2:1 MUX M5 can only generate the correct data bit after its select signal has gone low. Due to the long clock-to-Q delay of latch L10, the delay ($\Delta t_2$) between the rising edge of CLK and the update in the value of $y_{even}[n]$ is now greater. In a real implementation, the clock-to-Q delay of latch L10 would not be so disproportionately long. However, even if the clock-to-Q delay of latch L10 matches the clock-to-Q delays of master-slave flip-flops L1-L2 and L3-L4, some penalty will usually be incurred from the second critical timing path because the delay of the 2:1 MUX from select to output is typically greater than from data input to output. This penalty prevents the architecture of FIG. 1 from achieving the fundamental timing limit.

In an attempt to eliminate the second critical timing path, latches L5 and L10 might be considered for removal, so that the previous bit (decided by one DFE half) is not delayed before selecting the 2:1 MUX (in the other DFE half).

Figure 3:
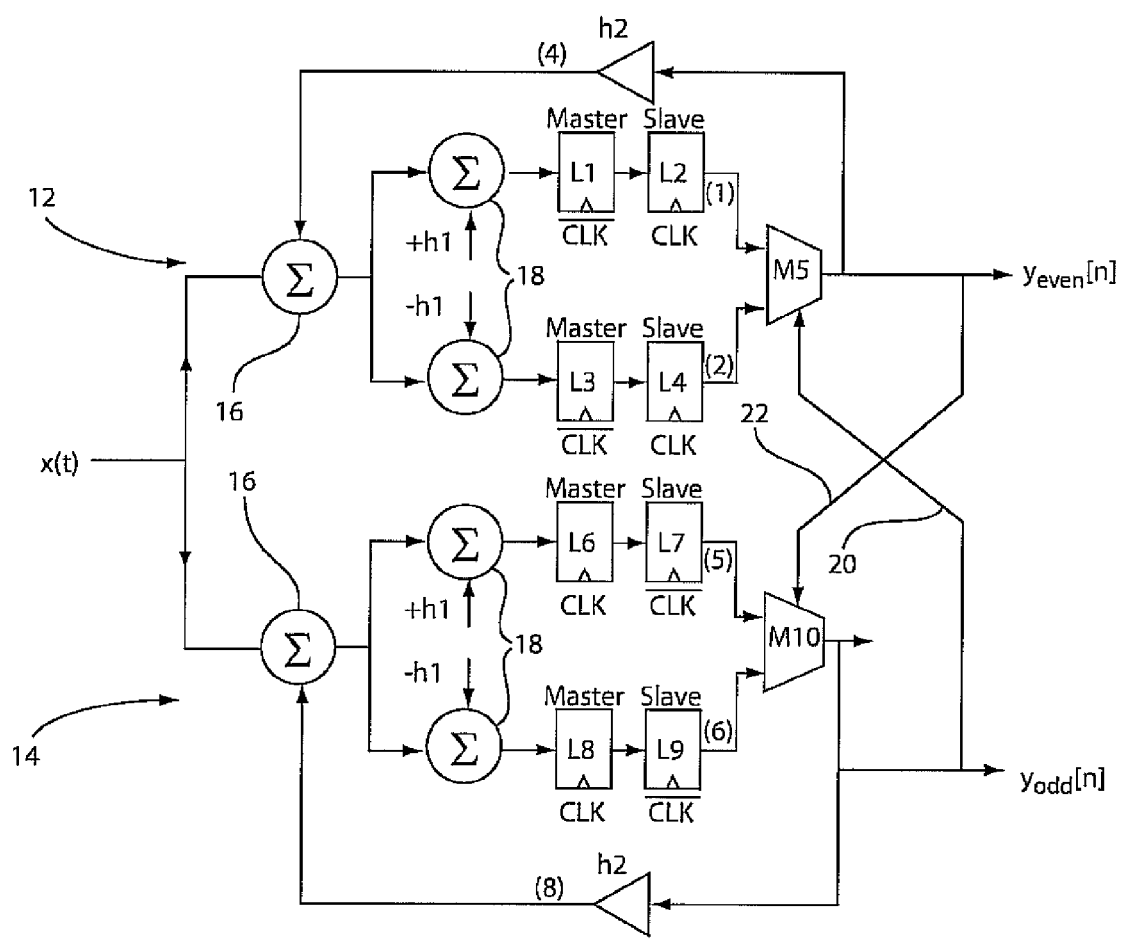
FIG. 3 is an illustrative DFE architecture modifying the architecture shown in FIG. 1 by removing latches L5 and L10.

Referring to FIG. 3, a DFE architecture 100 shows the architecture of FIG. 1 modified by removing latches L5 and L10 in this manner in accordance with a less preferable embodiment. The even and odd data outputs ($y_{even}[n]$ and $y_{odd}[n]$) are now directly connected to the select inputs 22 and 20 of the 2:1 MUXes M10 and M5, respectively.

Figure 4:
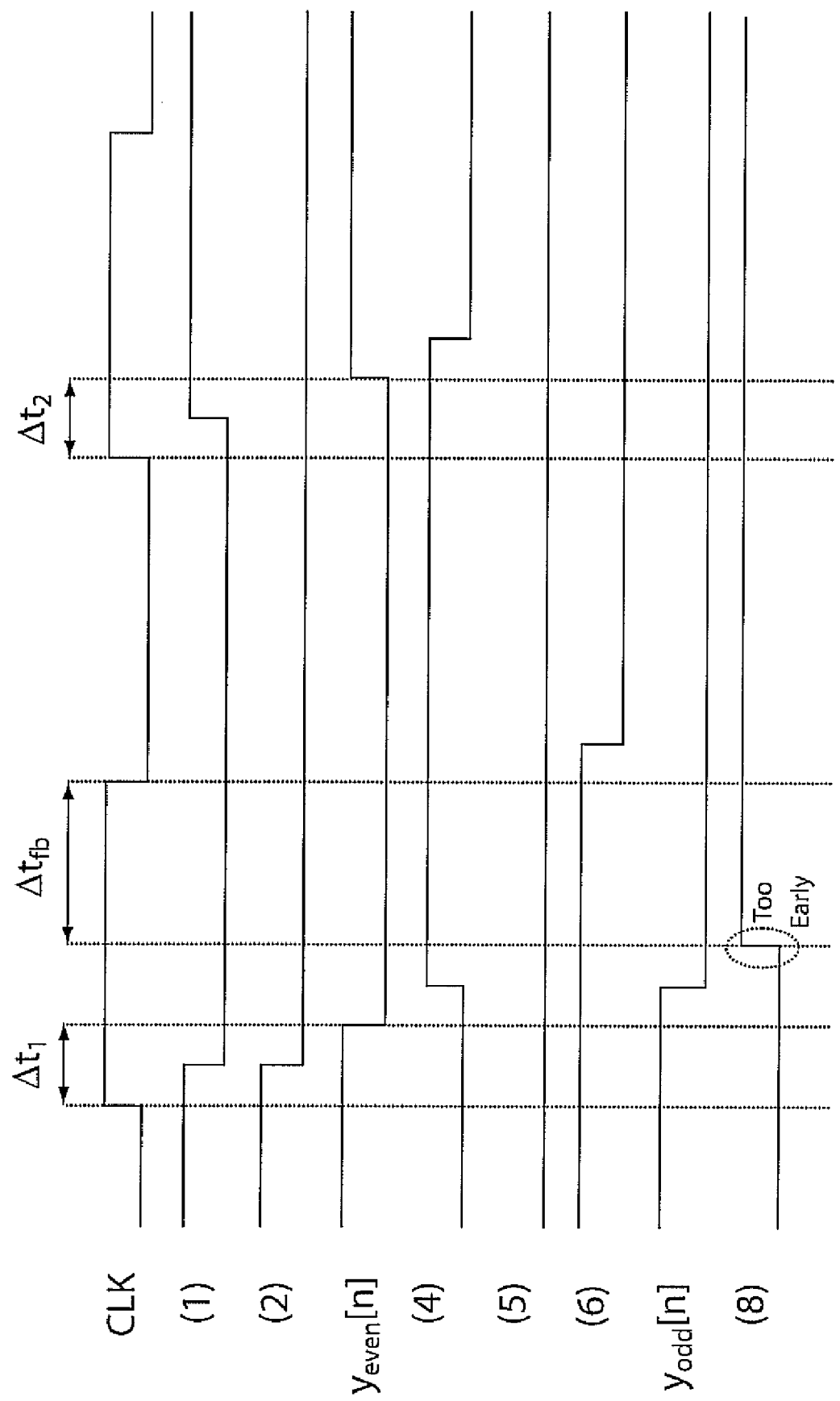
FIG. 4 is a timing diagram for the DFE architecture shown in FIG. 3.

Referring to FIG. 4 with continued reference to FIG. 3, a timing diagram is shown which shows that removing latches L5 and L10 does eliminate the second critical timing path. Note that the falling edge of $y_{odd}[n]$ occurs well before the second rising edge of CLK. Since the select signal for the 2:1 MUX M5 is established well ahead of the data bits from master-slave flip-flops L1-L2 and L3-L4, the delay ($\Delta t_2$) between the second rising edge of CLK and the update in the value of $y_{even}[n]$ is no longer inflated (i.e., $\Delta t_2$-$\Delta t_1$). However, latches L5 and L10 serve an important purpose in the DFE architecture of FIG. 1, so simply removing them as suggested in FIG. 3 creates another problem which makes this an unattractive method of eliminating the second critical timing path.

In situations where the two paths used for speculation have generated different decisions (e.g., where signal (1) (or signal (5)) does not equal signal (2) (or signal (6)), early arrival of the select signal switches the output of the 2:1 MUX (M5 or M10), which then disturbs the h2 feedback signal before the master-slave flip-flops have had a chance to sample the equalized signal. This premature disturbance of the h2 feedback signal can be observed in FIG. 4. The first falling edge of $y_{even}[n]$ switches the output ($y_{odd}[n]$) of 2:1 MUX M10 from high to low, which in turn switches the h2 feedback signal (signal (8)) from low to high. This disturbance of the h2 feedback signal, which ruins the accuracy of the ISI compensation, occurs $\Delta t_{fb}$ earlier than the first falling edge of CLK. Since the lower master-slave flip-flops (L6-L7 and L8-L9) sample the equalized signal upon this falling edge of CLK, their decisions may be corrupted by the disturbance of the h2 feedback signal.

In accordance with another embodiment, a method for eliminating the second critical timing path while still preventing disturbance of the h2 feedback signal at the time of data decision by the slicers is provided. The operating principles can be most easily appreciated by first examining an alternative embodiment of the DFE architecture shown in FIG. 3. It should be understood that a section as referred to herein is a portion of the DFE which samples the data on a same phase of a clock signal. For example, a half-rate architecture has two sections, a quarter-rate architecture has four sections and so on.

Figure 5:
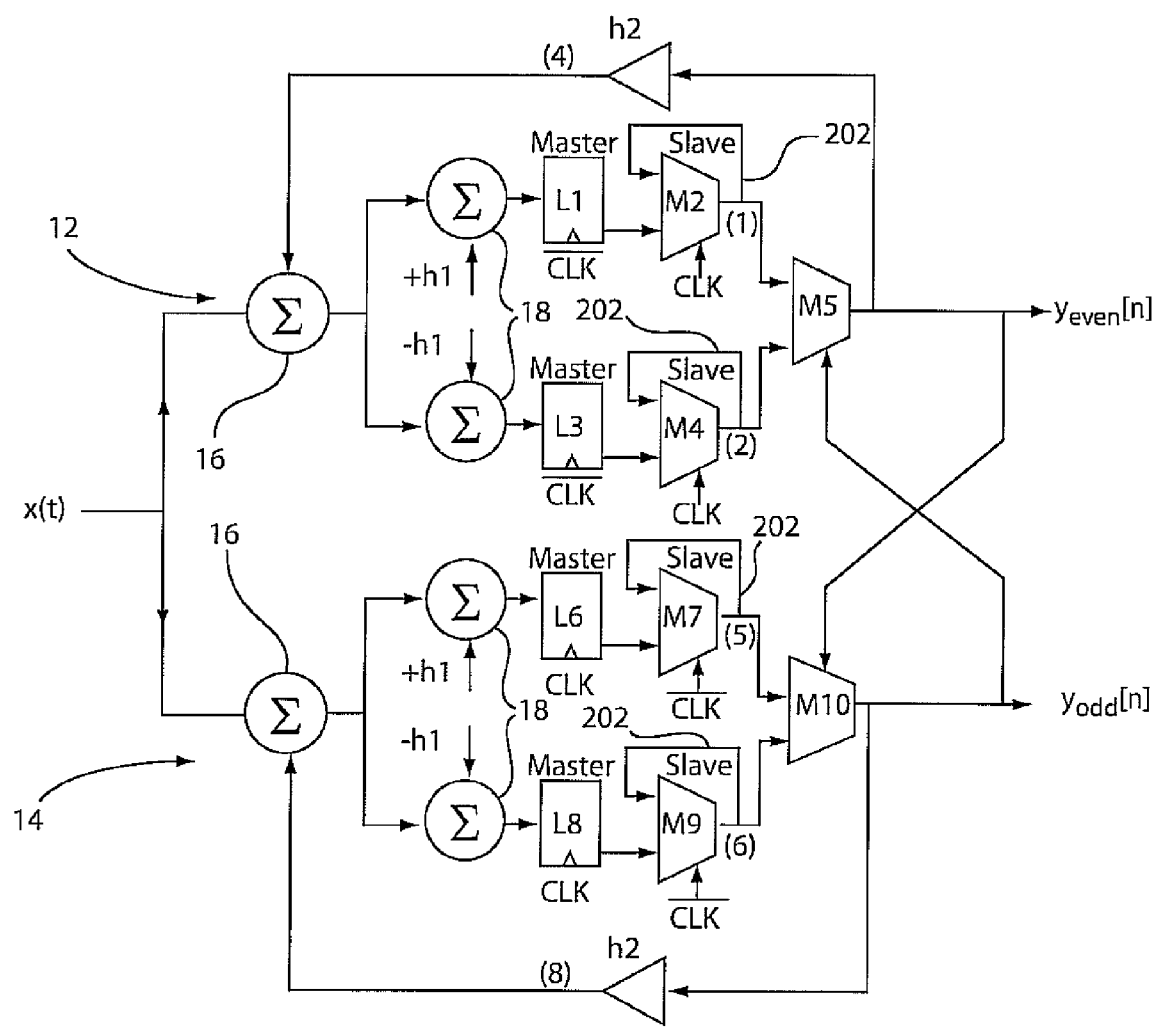
FIG. 5 is a schematic diagram showing an alternate embodiment of the DFE architecture shown in FIG. 3.

Referring to FIG. 5, a DFE 200 shows an alternate embodiment of the circuit depicted in FIG. 3 having two sections 12 and 14. Each slave latch (L2, L4, L7, L9 of FIG. 3) has been replaced with a MUX (M2, M4, M7, M9), denoted here as a "slave MUX", whose selector is driven by a half-rate clock (e.g., either CLK or the complement of CLK). One of the two inputs of each slave MUX (M2, M4, M7, M9) is connected to the output of its corresponding master latch (slicer) (L1, L3, L6 or L8) (former input), while the other input is connected to its own output (forming a positive feedback loop 202) (latter input). When the slave MUX (M2, M4, M7, M9) reads the former input, its state is transparent, and it passes the output of its corresponding master latch to an input of the 2:1 MUX (M5 or M10) used for speculation. When the slave MUX reads the latter input, the positive feedback causes the slave MUX (M2, M4, M7, M9) to latch the data bit originally decided by the master latch (L1, L3, L6, L8). Thus, the operation of the slave MUXes in FIG. 5 is equivalent to that of the slave latches (L2, L4, L7, L9) in FIG. 3.

Figure 6:
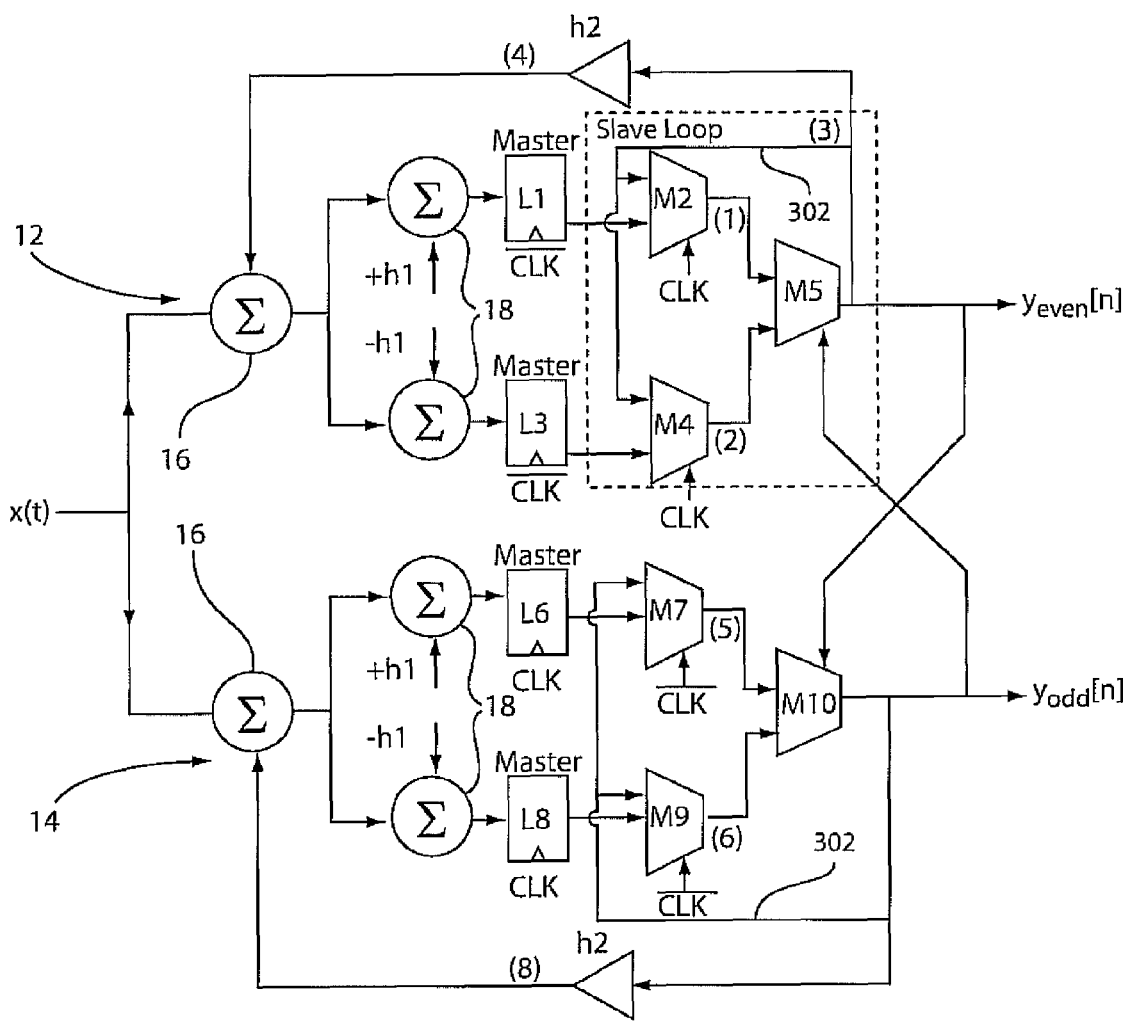
FIG. 6 is a schematic diagram of a half-rate DFE architecture representing an illustrative embodiment in accordance with the present principles.

Referring to FIG. 6, a DFE 300 includes one preferred embodiment. DFE 300 includes a connection of an upper input of each slave MUX (M2, M4, M7, M9) not to its own output, but to an output of a following 2:1 MUX (M5 or M10) used for speculation (M5 for the even DFE half 12, M10 for the odd DFE half 14). During one phase of the half-rate clock (CLK), the slave MUXes (M2, M4 or M7, M9) within one DFE half (either even or odd) read their lower inputs and pass the outputs of their corresponding master latches (L1, L3 or L6, L8) to the 2:1 MUX (M5 or M10) used for speculation. The operation of the slave MUXes in this transparent state is identical to that described above for the DFE architecture of FIG. 5. During the opposite phase of CLK, these slave MUXes (M2, M4, or M7, M9) read their upper inputs, so the output of the 2:1 MUX used for speculation (M5 or M10) is fed back to both of its own inputs, forming a positive feedback loop 302 (denoted "slave loop"). Due to the positive feedback, the slave loop 302 latches the correct data bit (i.e., the data decision selected by M5 or M10, corresponding to the correct polarity for h1 compensation).

One advantage of this arrangement is that both inputs of the 2:1 MUX (M5 or M10) used for speculation are latched to the same logical value, even if the master latches L1 and L3 (or L6 and L8) had made different data decisions. Since both inputs of the 2:1 MUX (M5 or M10) used for speculation are now logically identical, changing the select signal of this 2:1 MUX has no effect on its output and therefore does not cause premature disturbance of the h2 dynamic feedback signal. Therefore, this DFE architecture 300 is free from the disturbance problem which degrades the performance of the DFE architecture shown in FIG. 3 (or, equivalently, FIG. 5).

Figure 7:
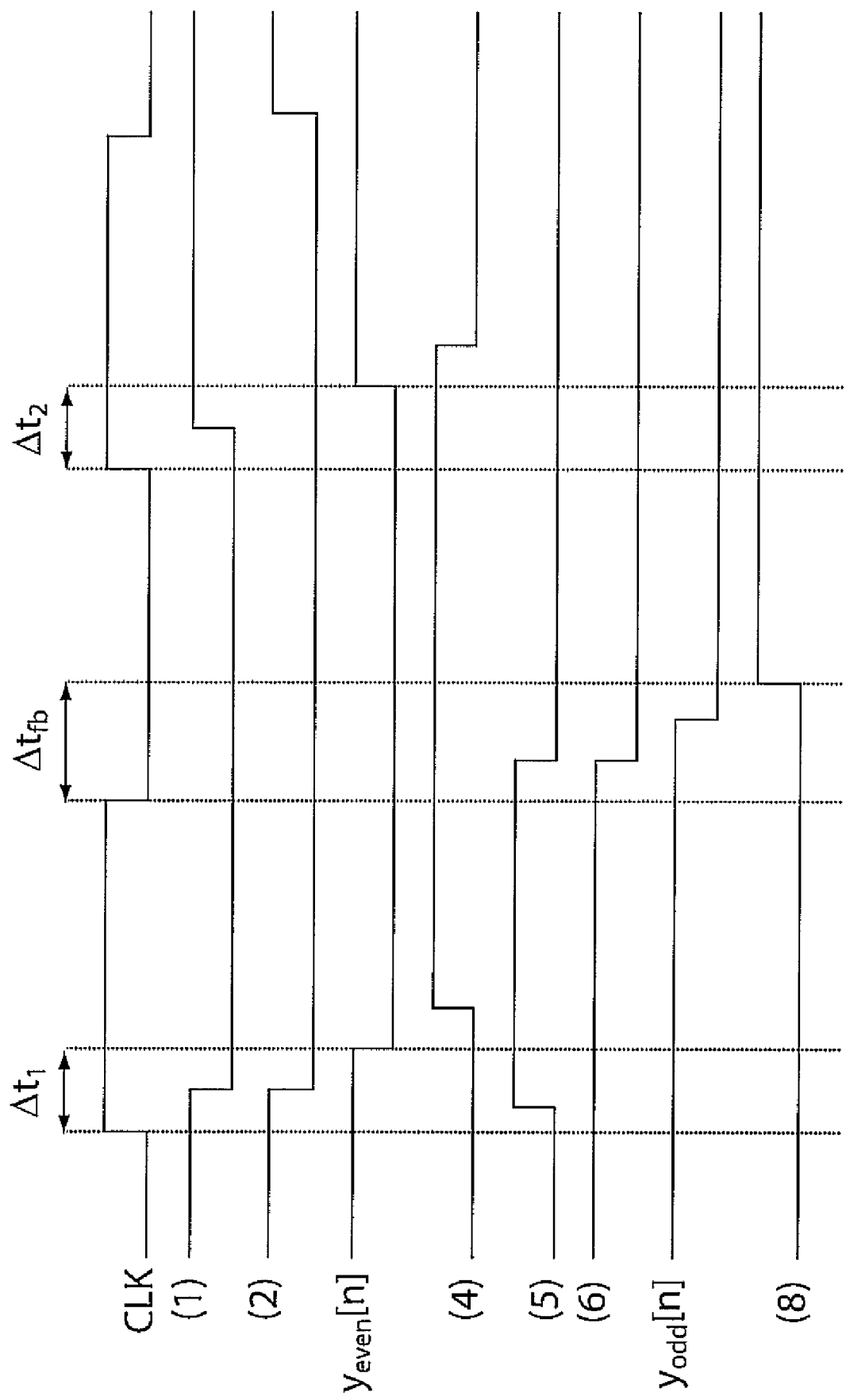
FIG. 7 is a timing diagram for the DFE architecture shown in FIG. 6.

Referring to FIG. 7 with continued reference to FIG. 6, a timing diagram is shown for the DFE architecture 300 shown in FIG. 6. Because the select signals for the 2:1 MUXes (M5 and M10) used for speculation are not delayed by latches, such as L5 and L10, the new architecture 300 does eliminate the second critical timing path which limits the operating frequency of the prior art DFE architecture shown in FIG. 1. In particular, note that the falling edge of $y_{odd}[n]$ occurs well before the second rising edge of CLK. Therefore, the switching of the output ($y_{even}[n]$) of 2:1 MUX M5 is not held up by the arrival of its select signal, and $\Delta t_2 = \Delta t_1$. The freedom from premature disturbance of the h2 dynamic feedback signal is also evident in FIG. 7.

Prior to the first rising edge of CLK, the output of M7 (signal (5)) is low, while the output of M9 (signal (6)) is high (reflecting a case where the two paths used for speculation have generated different decisions). Because the select signal ($y_{even}[n]$) of 2:1 MUX M10 is currently high, M10 reads the output of M9, and $y_{odd}[n]$ is high (indicating that the data decision with correct polarity of h1 compensation is a binary 1). Upon the first rising edge of CLK, this high value is latched by the slave loop 302 comprising M7, M9, and M10, so signal (5) also becomes high (after a short propagation delay), matching the logical value of signal (6). Since both inputs of 2:1 MUX M10 are now both high, its output does not change when its select signal ($y_{even}[n]$) switches a short time later from high to low.

Consequently, the h2 feedback signal (signal (8)) is not disturbed at this time. Now, the output ($y_{odd}[n]$) of 2:1 MUX M10 only changes when CLK goes low, and the master latches L6 and LB make new data decisions. As a result, the change in the h2 feedback signal (signal (8)) now occurs $\Delta t_{fb}$ later than the first falling edge of CLK. Because the second critical timing path is eliminated, and premature disturbance of the h2 feedback signal is prevented, the implementation of FIG. 6 is able to achieve the fundamental timing limit of a half-rate DFE architecture with one tap of speculation. Another advantage of the new architecture over the prior art architecture of FIG. 1 is that the elimination of latches L5 and L10 saves hardware and reduces power dissipation.

The description of the present embodiments has focused on the equalization of binary (two-level) signals. However, the present principles are also applicable to the equalization of multi-level signals, such as four-level pulse amplitude modulation (PAM-4) signals, and other architectures and technologies.

Figure 8:
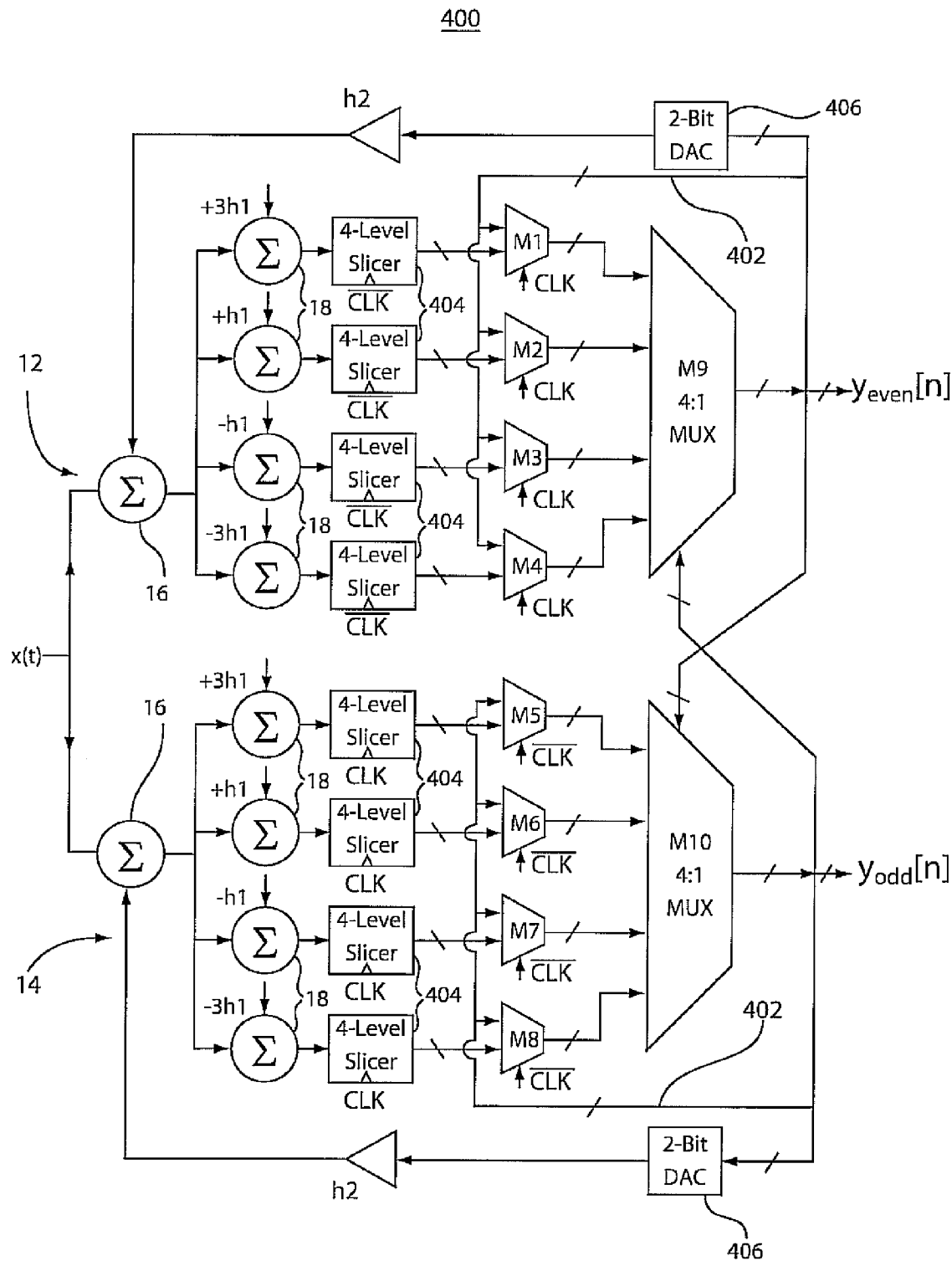
FIG. 8 is a schematic diagram showing an alternate embodiment of the half-rate DFE architecture shown in FIG. 6 for operation with PAM-4 signaling.

Referring to FIG. 8, a DFE architecture 400 illustrates how the architecture of FIG. 6 can be modified to perform the equalization of PAM-4 signals. Since the previous PAM-4 symbol may have one of four different values (with normalized signal levels of −3, −1, +1, and +3), each DFE half (12 or 14) now has four speculative paths (with offsets of +3h1, +h1, −h1, and −3h1, respectively). Instead of a master latch (e.g., a simple 2-level slicer), a 4-level slicer 404 converts an analog output of each second stage summer 18 to a multi-bit (e.g., 2-bit) code representing a data decision. The 4-level slicers 404 are followed by slave MUXes M1-M8.

In the transparent state, a slave MUX (M1-M8) passes a multi-bit output of its corresponding 4-level slicer 404 to the 4:1 MUX (M9 or M10) used for speculation. This 4:1 MUX (M9 or M10) is selected by the previous PAM-4 symbol, detected by the opposite DFE half. In the latched state, the (multi-bit) output of this 4:1 MUX (M9 or M10) is passed back (through four slave MUxes) to all four of its own inputs. A slave loop 402 for the even DFE half 12 comprises MUXes M1, M2, M3, M4, and M9, and the slave loop 402 for the odd DFE half 14 comprises MUXes M5, M6, x7, M8, and M10. Since all four inputs of the 4:1 MUX (M9 or M10) used for speculation are latched to the same logical value, changing the select signal of this 4:1 MUX has no effect on its output and therefore does not cause premature disturbance of the h2 dynamic feedback signal.

In each DFE half, a 2-bit digital-to-analog converter (DAC) 406 is used to generate one of four levels for the h2 dynamic feedback signal. Like the two-level embodiment of FIG. 6, this four-level embodiment achieves the fundamental timing limit of a half-rate DFE architecture with one tap of speculation.

Other straightforward modifications and variations of the disclosed embodiments, such as the use of quarter-rate instead of half-rate architecture are contemplated and would be understood to those skilled in the art. Such modifications and variations do not depart from the spirit and scope of the invention.

Having described preferred embodiments of multi-tap decision feedback equalizer (DFE) architectures eliminating critical timing path for higher-speed operation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A decision feedback equalizer (DFE), comprising:
summer circuits configured to add a dynamic feedback signal representing a dynamic feedback tap to a received input and to speculate on a speculative tap;
data slicers configured to receive outputs of the summer circuits and sample the outputs of the summer circuits in accordance with a clock signal;
first multiplexers, each first multiplexer configured to receive a first input from a corresponding data slicer; and
second multiplexers, each configured to receive an output of a plurality of the first multiplexers, the second multiplexers having an output fed back to a second input of the first multiplexers and the second multiplexer output being employed to provide a select signal for a second multiplexer on a different section of the DFE and to drive the dynamic feedback signal to a summer circuit on a same section of the DFE.

2. The DFE as recited in claim 1, wherein the DFE includes a multi-level DFE, where the multi-level includes greater than two levels.

3. The DFE as recited in claim 1, wherein the DFE achieves a fundamental timing limit of a half-rate DFE architecture with one tap of speculation.

4. The DFE as recited in claim 1, wherein the dynamic tap includes a signal transition which occurs after a transition in the clock signal such that the dynamic tap is not disturbed before a data decision time of the data slicers.

5. The DFE as recited in claim 1, wherein an update of the output of the second multiplexers is not delayed by waiting for the select signal.

6. The DFE as recited in claim 1, wherein inputs to the second multiplexers are always logically identical during a change in the select signal.

7. The DFE as recited in claim 1, wherein the output fed back to the second input of the first multiplexers forms a slave feedback loop.

8. The DFE as recited in claim 7, wherein positive feedback of the slave feedback loop latches all inputs of the second multiplexer to logically identical values.

9. A decision feedback equalizer (DFE), comprising:
a first half circuit configured to process even data bits and a second half circuit configured to process odd data bits, each half circuit comprising:
summer circuits configured to add a dynamic feedback signal representing a dynamic feedback tap to a received input and to speculate on a speculative tap;
data slicers configured to receive outputs of the summer circuits and sample the outputs of the summer circuits in accordance with a clock signal;
first multiplexers, each first multiplexer configured to receive a first input from a corresponding data slicer;
a second multiplexer configured to receive an output of the first multiplexers; and
a slave feedback loop including an output of the second multiplexer fed back to a second input of the first multiplexers wherein the second multiplexer output provides a select signal for a second multiplexer for the other of the first and second half circuits and drives the dynamic feedback signal to a summer circuit on a same half circuit.

10. The DFE as recited in claim 9, wherein the DFE includes a multi-level DFE, where the multi-level includes greater than two levels.

11. The DFE as recited in claim 9, wherein the DFE achieves a fundamental timing limit of a half-rate DFE architecture with one tap of speculation.

12. The DFE as recited in claim 9, wherein the dynamic tap includes a signal transition which occurs after a transition in the clock signal such that the dynamic tap is not disturbed before a data decision time of the data slicers.

13. The DFE as recited in claim 9, wherein an update of the output of the second multiplexer is not delayed by waiting for the select signal.

14. The DFE as recited in claim 9, wherein inputs to the second multiplexers are always logically identical during a change in the select signal.

15. The DEE as recited in claim 9, wherein positive feedback of the slave feedback loop latches all inputs of the second multiplexer to logically identical values.

16. A method for decision feedback equalization, comprising:
speculating on an h1 tap using summer circuits configured to add a dynamic feedback signal representing an h2 tap to a received input;
sampling outputs of the summer circuits in accordance with a clock signal such that data slicers output data bits;
receiving a first input from a corresponding data slicer by first multiplexers;
receiving an output of the first multiplexers by second multiplexers; and feeding back an output of the second multiplexers to a second input of the first multiplexers wherein the second multiplexer output is employed to provide a select signal for a second multiplexer on a different section of a decision feedback equalizer (DFE) and to drive the dynamic feedback signal to a summer circuit on a same section of the DFE.

17. The method as recited in claim 16, wherein the DFE achieves a fundamental timing limit of a half-rate DFE architecture with one tap of speculation.

18. The method as recited in claim 16, wherein the dynamic tap includes a signal transition which occurs after a transition in the clock signal such that the dynamic tap is not disturbed before a data decision time of the data slicers.

19. The method as recited in claim 16, wherein an update of the output of the second multiplexer is not delayed by waiting for the select signal.

20. The method as recited in claim 16, wherein feeding back includes latching all inputs of the second multiplexer to logically identical values such that inputs to the second multiplexers are always logically identical during a change in the select signal.

* * * * *